United States Patent [19]

Bailey et al.

[11] 4,332,090
[45] Jun. 1, 1982

[54] DIRECTIONAL TWO AXIS OPTICAL INCLINOMETER

[75] Inventors: Escar L. Bailey, Athens; Clifford G. Walker, Huntsville, both of Ala.

[73] Assignee: The United States of America as represented by the Secretary of the Army, Washington, D.C.

[21] Appl. No.: 119,275

[22] Filed: Feb. 7, 1980

[51] Int. Cl.³ .............................................. G01C 9/06
[52] U.S. Cl. ................................................... 33/366
[58] Field of Search ............ 33/366, 377; 250/231 R, 250/577; 73/293, 516

[56] References Cited

U.S. PATENT DOCUMENTS 3,464,276 9/1969 Liebert .............................. 33/377 X
3,741,656 6/1973 Shapiro ................................ 250/577

Primary Examiner—Charles E. Phillips
Attorney, Agent, or Firm—Nathan Edelberg; Robert P. Gibson; James T. Deaton

[57] ABSTRACT

An inclinometer which employs a laser light source with a transparent liquid and a gas and the laws of optics to reflect the light source to a detector which provides signals for measuring the tilt angle and the direction of tilt from the local horizontal.

3 Claims, 2 Drawing Figures

DIRECTIONAL TWO AXIS OPTICAL INCLINOMETER

DEDICATORY CLAUSE

The invention disclosed herein may be manufactured, used, and licensed by or for the Government for governmental purposes without the payment to us of any royalties thereon.

BACKGROUND OF THE INVENTION

In the past, devices for indicating tilt from the vertical have included such devices as a liquid bubble principle with visual indication only, a liquid bubble principle with an electrical output, or a pendulum mass principle with an electrical output. With these devices, high accuracy is not obtainable. Therefore, a need exists for a device which will measure two axis tilt angles with high accuracy.

In view of the need, it is an object of this invention to provide a measuring device that has two axis tilt angles and utilizes optic means that has high accuracy for indicating deviation in tilt of the device.

Another object of this invention is to provide a device that utilizes simple components that are already available and can be used to produce a new and novel directional two-axis optical inclinometer.

Still another object of this invention is to provide an optical inclinometer which can utilize a detector element that can have a varying number of detector elements depending upon the sensitivity desired of the device.

Other objects and advantages of this invention will be obvious to those skilled in this art.

SUMMARY OF THE INVENTION

In accordance with this invention, a directional two-axis optical inclinometer is provided which includes a container with a transparent liquid therein with a gas contained over the transparent liquid. A light source directs light toward the liquid and through the liquid to a bottom surface of the container which is reflective and reflects the light back through the liquid and out through the gaseous medium onto a detector which detects tilt of the container and liquid from true vertical and produces outputs which are used for producing a readout on an indicator.

DESCRIPTION OF THE PREFERRED EMBODIMENT

Figure 1:
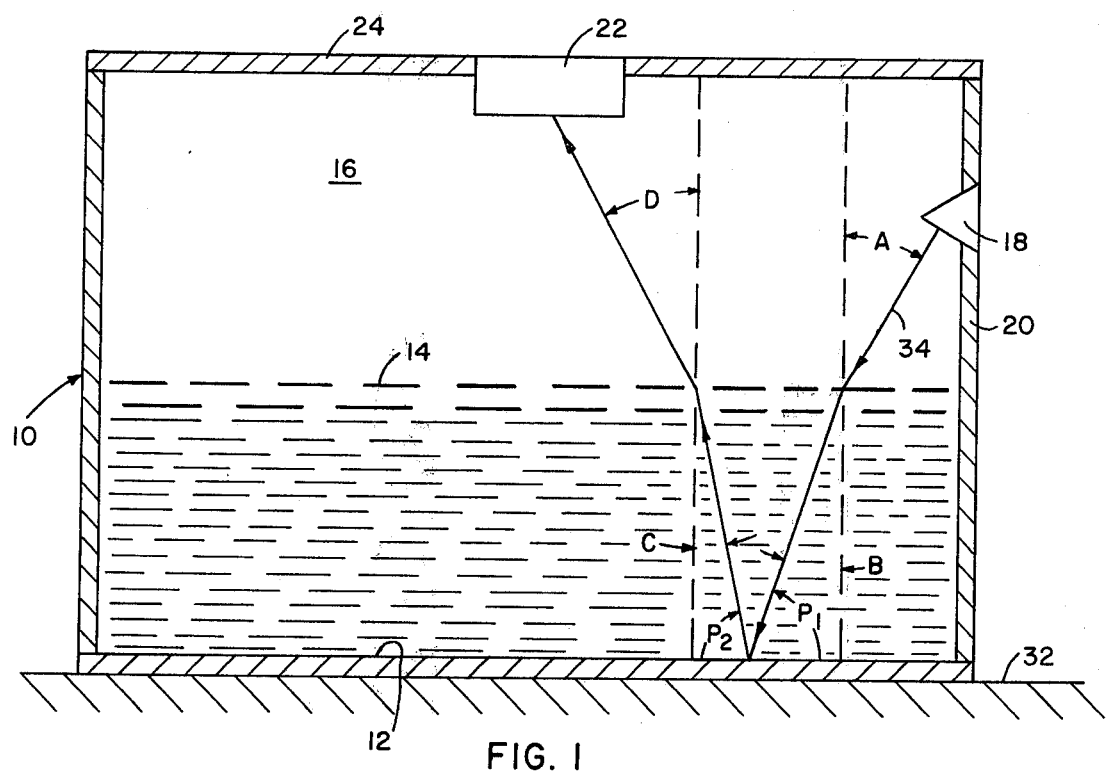
FIG. 1 is a schematic sectional view of a two-axis optical inclinometer in accordance with this invention.

Referring now to the drawing, a generally rectangular tank 10 is illustrated that has a reflective surface 12 at the bottom thereof and a transparent liquid such as water therein. The space over liquid 14 contains a transparent gas 16 such as air. A laser light source 18 that emits collimated light is mounted in one side 20 of container 10. A light sensitive quadrant detector 22 is mounted in topside 24 of container 10. Quadrant detector 22 (see FIG. 2) contains four quadrants or multiples of four quadrants up to the number desired for the particular sensitivity desired of the detector. Detector 22 can be a conventional silicon detector or gallium arsenide detector. Each quadrant or segment of detector 22 is connected by a lead 26 to cable 28 and from cable 28 into read-out indicator 30. Read-out indicator 30 is a conventional type readout device that includes circuitry for receiving the outputs from detector 22 and the indicator is adapted so as to detect either a voltage or current indication from detector 22 with the voltage or current emanating from detector 22 being proportional to the intensity of the light energy reflected onto detector 22.

As can be seen, the inclinometer employs light source 18 and the reflection law of optics for measuring the tilt angle and the direction of tilt from the local horizontal. The local horizontal is established by using a low viscosity liquid 14 as illustrated that has a refraction index. Any angle change in test table 32 in any direction from the horizontal plane will change the liquid vertical angle with respect to collimated light rays 34 emanating from source 18. This change from the horizontal changes each angle A, B, C and D, due to the refraction law, and will move the tilt pattern on detector 22 in proportion to and in the direction of the input tilt angle.

Figure 2:
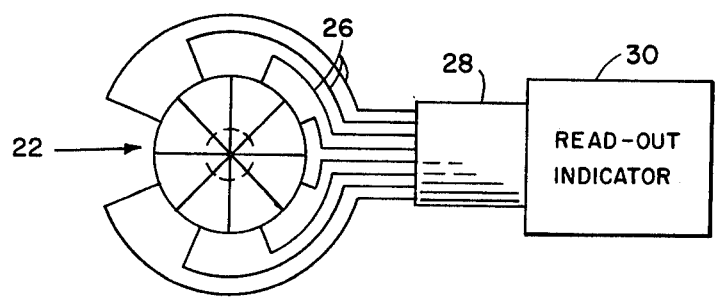
FIG. 2 is a schematic view of the detector with its connection to a readout indicator.

In more particular operation, light source 18 of the inclinometer emits light beam 34 which has an appropriate beam pattern for detector 22. Light beam 34 first passes through gas medium 16 and strikes liquid medium 14 at angle A. The light beam is then refracted by liquid medium 14 by angle B and then strikes reflecting mirror surface 12 at angle $P_1$ and is reflected by angle $P_2$. The light beam proceeds through liquid medium 14 at angle C and enters gas medium 16 at refracted angle D and finally strikes detector 22. Multi-element detector 22 (see FIG. 2) has a geometric shape in such a manner that detector 22 provides the proper output signal for the tilt angle detected and in the direction of the tilt. This output signal is provided through leads 26 and cable 28 to readout indicator 30 from which the tilt angle and direction of the tilt is accurately read. When in the horizontal position, light from source 18 strikes detector 22 with a light pattern similar to the dotted line pattern as illustrated in FIG. 2. Also, it is to be understood that each quadrant element of detector 22 has a conventional power supply connected thereacross so as to enable a conventional output in voltage or current to be obtained for example through output leads 26. It is also understood that light source 18 is to have a conventional power source connected thereto.

We claim:
1. A directional two-axis optical inclinometer comprising a container having a top cover mounted at the top thereof and a transparent liquid therein, a bottom of said container having a reflective surface, a collimated light source mounted on said container above the level of said liquid in said container and directing collimated light toward the surface of said liquid and to said reflective surface, said light entering and leaving said liquid at a variable angle with respect to the surface of said liquid in response to the tilt of said container, said container having a transparent gas medium over said liquid, and a solid state quadrant type detector mounted on said top cover and adapted for receiving reflected light reflected off said reflective surface from said light source and producing output signals, a read-out indicator connected to the output signals from said detector and providing readout indication which is proportional to the intensity of the light energy reflected onto the de- tector and indicating the tilt angle and the direction of the tilt of the container.

2. A directional two-axis optical inclinometer as set forth in claim 1, wherein said light source is a laser source and wherein said detector is a quadrant type detector that is made of silicon or gallium arsenide.

3. A directional two-axis optical inclinometer as set forth in claim 2, wherein said transparent liquid is water and said transparent gas is air.

* * * * *